US009673635B2

(12) United States Patent
Sequeira et al.

(10) Patent No.: US 9,673,635 B2
(45) Date of Patent: Jun. 6, 2017

(54) SELF SUSTAINING ENERGY HARVESTING SYSTEM

(71) Applicants: Melwyn F. Sequeira, Plantation, FL (US); Mohammad Mohiuddin, Boynton Beach, FL (US); Richard L. Copeland, Lake Worth, FL (US)

(72) Inventors: Melwyn F. Sequeira, Plantation, FL (US); Mohammad Mohiuddin, Boynton Beach, FL (US); Richard L. Copeland, Lake Worth, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 402 days.

(21) Appl. No.: 14/570,524

(22) Filed: Dec. 15, 2014

(65) Prior Publication Data
US 2016/0172868 A1    Jun. 16, 2016

(51) Int. Cl.
*H02J 1/10*    (2006.01)
*H02J 7/00*    (2006.01)
(Continued)

(52) U.S. Cl.
CPC .............. *H02J 5/005* (2013.01); *G08B 17/00* (2013.01); *G08B 29/181* (2013.01); *H02J 1/10* (2013.01);
(Continued)

(58) Field of Classification Search
None
See application file for complete search history.

(56) References Cited

U.S. PATENT DOCUMENTS 7,982,439 B2   7/2011   Trainor et al.
8,618,934 B2   12/2013  Belov et al.
(Continued)

FOREIGN PATENT DOCUMENTS

| CN | 102624071 A | 8/2012 |
| FR | 2939248 A1 | 6/2010 |
| WO | 2005067121 A1 | 7/2005 |

OTHER PUBLICATIONS

M. Glavin, P. Chan, S. Armstrong, and W. Hurley, "A stand-alone photovoltaic supercapacitor battery hybrid energy storage system," 2008 13th IEEE Power Electronics and Motion Control Conference, (Poznan, Poland, Sep. 1-3, 2008), IEEE, Piscataway, NJ, USA, Sep. 1, 2008, pp. 1688-1695, XP031343817, ISBN: 978-1-4244-1741-4.
(Continued)

*Primary Examiner* — Jared Fureman
*Assistant Examiner* — Aqeel Bukhari
(74) *Attorney, Agent, or Firm* — Fox Rothschild LLP; Robert J. Sacco; Carol E. Thorstad-Forsyth

(57) ABSTRACT

Systems (100) and methods (400) for powering an electrical load (322) in an environment. The methods involve using a battery (310) to simultaneously supply electrical energy to control electronics (308, 316) and a Super Capacitor ("SC") storage element (314) immediately after a system has been disposed in the environment and turned on. In effect, the control electronics are caused to perform intended functions thereof nearly instantaneously after turning on the system. The SC storage element is charged from a first charge state in which approximately zero volts exist across terminals thereof to a second charge state in which greater than zero volts exists across the terminals. The SC storage element is then used to supply electrical energy to the electrical load of the system so as to cause the electrical load to perform intended functions thereof.

15 Claims, 4 Drawing Sheets

(51) Int. Cl.
*H02J 7/35* (2006.01)
*H02J 5/00* (2016.01)
*H02J 7/34* (2006.01)
*H02J 7/02* (2016.01)
*G08B 17/00* (2006.01)
*G08B 29/18* (2006.01)

(52) U.S. Cl.
CPC ............ *H02J 7/007* (2013.01); *H02J 7/0068* (2013.01); *H02J 7/025* (2013.01); *H02J 7/345* (2013.01); *H02J 7/35* (2013.01); *H02J 7/0054* (2013.01)

(56) References Cited

U.S. PATENT DOCUMENTS

| | | |
|---|---|---|
| 2004/0232878 A1 | 11/2004 | Couch |
| 2010/0060231 A1 | 3/2010 | Trainor |
| 2011/0050756 A1* | 3/2011 | Cassidy .................. G09G 3/20 345/690 |
| 2011/0199026 A1 | 8/2011 | Forrest et al. |
| 2013/0265140 A1 | 10/2013 | Gudan et al. |
| 2013/0336185 A1 | 12/2013 | Yang et al. |
| 2014/0183947 A1* | 7/2014 | Chandler ................ H02J 9/061 307/23 |
| 2015/0372536 A1* | 12/2015 | Naskali .................... H02J 9/06 307/66 |
| 2016/0198818 A1* | 7/2016 | Akin ...................... A45B 25/00 29/592.1 |

OTHER PUBLICATIONS

PCT International Search Report and Written Opinion of the International Searching Authority for Intl. Appln. No. PCT/US2015/065737 dated Mar. 2, 2016.

\* cited by examiner

SELF SUSTAINING ENERGY HARVESTING SYSTEM

FIELD OF THE INVENTION

This document relates generally to power management systems. More particularly, this disclosure relates to systems and methods for efficiently charging a storage element and managing power to a load in a relatively low energy density environment.

BACKGROUND OF THE INVENTION

Wireless sensorization is replacing hard-wired fire protection sensing systems. Typically, the hard-wired fire protection sensing systems (e.g., smoke detectors) are hard-wired to the fire protection system's main fire panel. The main fire panel often resides at the front or in the basement of a building. The hard-wired fire protection sensing systems are deployed across the building's infrastructure and draw their power from the centralized power source (namely, the main fire panel). Relatively long wires are required to run throughout the building to facilitate the supply of power from the main fire panel to each of the hard-wired fire protection sensing systems. In effect, the systems have large installation costs resulting from the amount of labor and time required to install the same within the building.

Wireless sensorization is also being deployed using batteries to provide sensor and transceiver power. However, these batteries typically have to be replaced within one to two years. In some scenarios, thousands of sensors may be deployed within a single building. One can appreciate that it is quite expensive (in terms of labor, time and part costs) to replace the batteries every few years for each of these sensors.

SUMMARY OF THE INVENTION

The disclosure concerns implementing systems and methods for powering an electrical load in an environment. The methods involve using a battery to simultaneously supply electrical energy to control electronics and a Super Capacitor ("SC") storage element of a system immediately after the system has been disposed in the environment and turned on. In effect, the control electronics are caused to perform intended functions thereof nearly instantaneously after turning on the system. The SC storage element is charged from a first charge state in which approximately zero volts exists across terminals thereof to a second charge state in which greater than zero volts exists across the terminals. The SC storage element is then used to supply electrical energy to the electrical load of the system so as to cause the electrical load to perform intended functions thereof.

Notably, the system continuously monitors a first output voltage of the battery, a second output voltage of the SC storage element and a third output voltage of an energy harvesting circuit of the system. The supply of electrical energy from the battery to the SC storage element is terminated based on a level of at least the second output voltage (e.g., when the second output voltage exceeds an upper threshold value of the SC storage element). The battery is used to recharge to SC storage element when the second output voltage falls below a first threshold value (e.g., when the second output voltage falls below a lower threshold value for the SC storage element). The energy harvesting circuit is used to recharge the battery once it has become active.

In some scenarios, the methods also involve: enabling a timer when the second output voltage reaches a desired level; and making a determination that the SC storage element has reached a leakage current equilibrium upon an expiration of a pre-defined time period which was detected based on an output of said timer. The battery's supply of electrical energy to the SC storage element is terminated when such as determination is made.

DESCRIPTION OF THE DRAWINGS

Embodiments will be described with reference to the following drawing figures, in which like numerals represent like items throughout the figures, and in which.

DETAILED DESCRIPTION OF THE INVENTION

Figure 1:
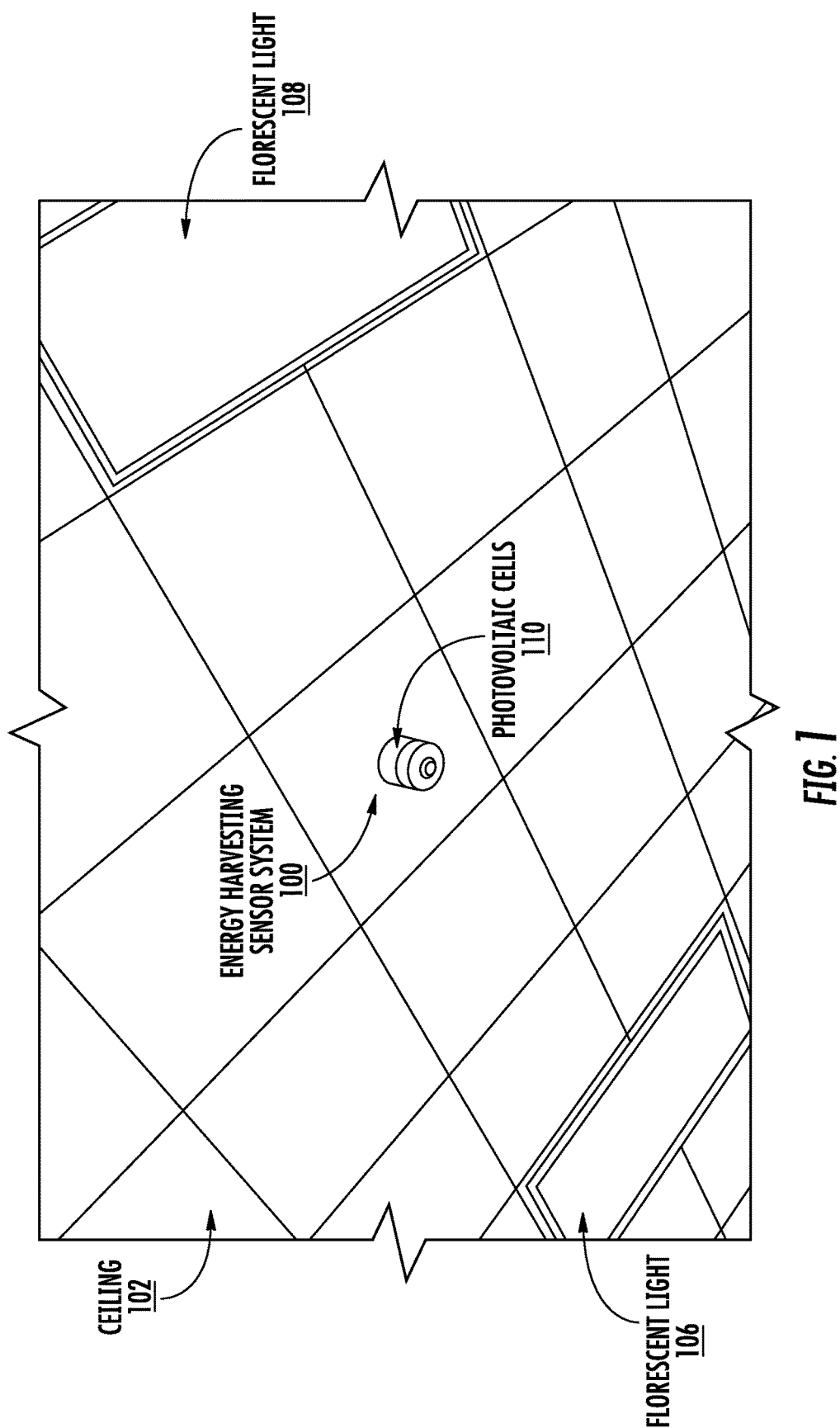
FIG. 1 is a schematic illustration showing an exemplary Energy Harvesting Sensor ("EHS") system coupled to a ceiling of a building.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure contemplates the use of a self-sustaining EHS system. The EHS system effectively delivers power to and operates one or more loads thereof (e.g., smoke detectors), without having a requirement for the frequent replacement of the power source(s) thereof (as is the case in conventional sensing systems such as that discussed above in the Background Section of this document). In this regard, the EHS system generally collects and converts energy from a light source located within the surrounding environment (e.g., within a building). The converted energy is stored on a first storage element of the EHS system (e.g., a rechargeable battery). Thereafter, the first storage element supplies power to a second storage element (e.g., a super capacitor), which subsequently supplies power to a load (e.g., a sensor).

Notably, the EHS system of the present disclosure operates efficiently in indoor environments where the relatively small amount of available energy from light sources thereof is sufficient to charge the first storage element (e.g., as little as 100 mV at 10's of μAmps). In contrast, such available energy is not sufficient to operate conventional boost converter circuits of conventional sensor systems with satisfactory efficiency. As a result, the amount of time needed to initiate operations of these conventional sensor systems (e.g., 10's to 100's of hours) is significantly longer as compared to that of the present EHS system (e.g., near instantaneous).

Additionally, in some conventional EHS systems, the first storage element comprises a super capacitor. Such conventional EHS systems are inoperable in indoor environments since the relatively small amount of available energy from sources of the indoor environment is not sufficient to charge the super capacitor to a level needed for the EHS systems to operate. In contrast, the first storage element of the present EHS system comprises a rechargeable battery. Consequently, the present EHS system is operable in indoor environments since the rechargeable battery has an initial amount of charge (e.g., 3.3 V) sufficient to cause the EHS system to perform its intended functions nearly instantaneously after being powered on, as well as to quickly charge a super capacitor. The battery is recharged by the indoor sources while the load(s) (e.g., a smoke sensor) is(are) being supplied power from the second storage element (e.g., a super capacitor).

Referring now to FIG. 1, there is provided a schematic illustration of an exemplary EHS system 100 coupled to a ceiling 102 of a building's indoor room. The only source of energy in this indoor room is produced by the lateral dispersion of light from florescent lights 106, 108. As a result, a luminance of approximately fifty to one hundred lux is provided at the EHS system 100. Such a luminance is insufficient to power the load(s) of the EHS system 100. As such, the EHS system 100 comprises a Power Management Circuit ("PMC") (not shown in FIG. 1) for ensuring that power is made available to the load(s) nearly instantaneously after the system has been deployed in the indoor environment.

Figure 2:
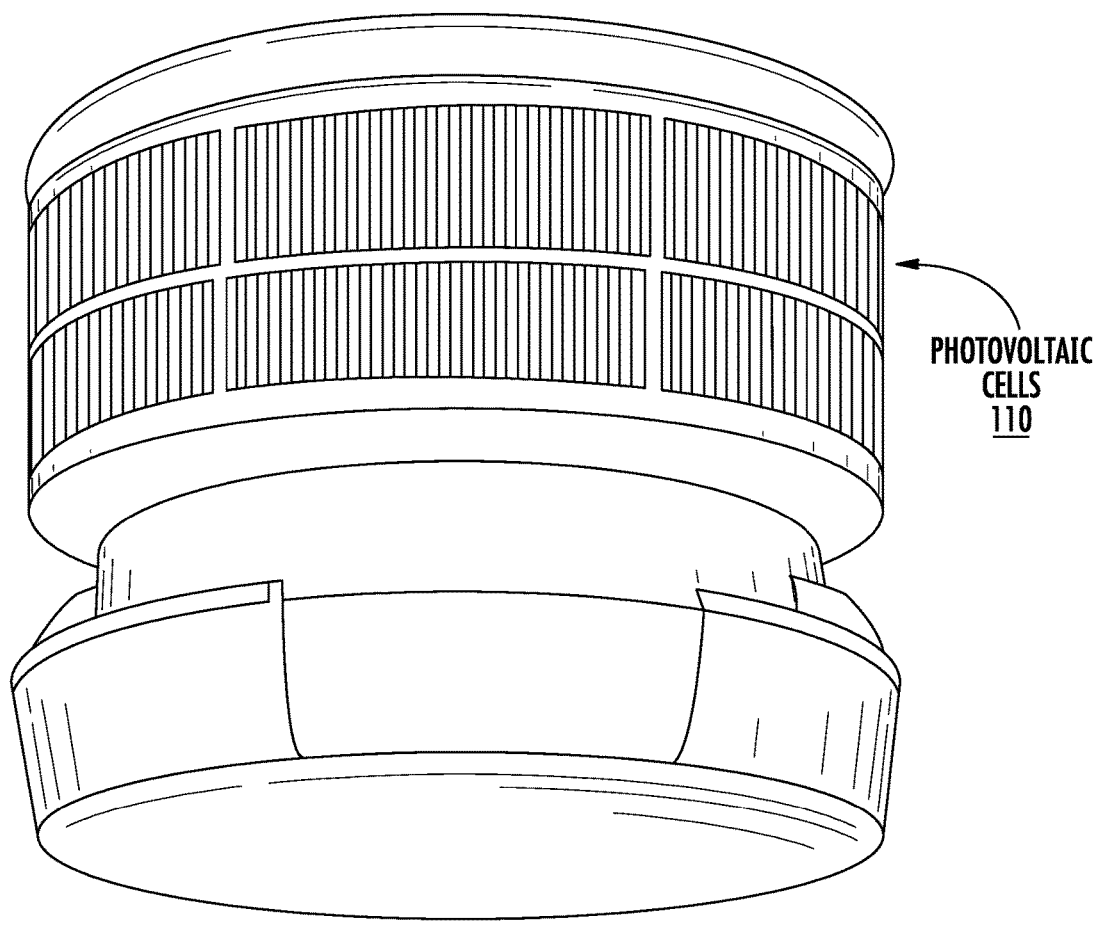
FIG. 2 is a schematic illustration of the EHS system of FIG. 1.

The PMC will be described in detail below in relation to FIG. 3. Still, it should be understood at this time that the PMC comprises photovoltaic cells 110 for converting florescent light energy into direct current electricity using semiconducting materials that exhibit the photovoltaic effect, as shown in FIGS. 1-2. When the photovoltaic cells 110 are exposed to the luminance of approximately fifty to one hundred lux, an extremely low energy power output is generated thereby. For example, in some scenarios, the direct current electrical output generated by the photovoltaic cells is five hundred milli-Volts at approximately three hundred micro-Amps, which results in a power output of one hundred fifty micro-Watts. Such a power level is not sufficient for charging a super capacitor based storage element in a satisfactory amount of time. As such, the present PMC employs a rechargeable battery (not shown in FIGS. 1-2) for storing a power output of the photovoltaic cells 110, instead of a super capacitor based storage element (as is done in some conventional sensor systems). A super capacitor based storage element (not shown in FIGS. 1-2) of the PMC is then charged by the output power of the rechargeable battery. In effect, the load(s) (not shown in FIGS. 1-2) of the present EHS system 100 is(are) supplied power nearly instantaneously after deployment of the system in the indoor environment. Additionally, the present EHS system 100 can operate fully autonomously and continuously available to perform its intended functions.

Figure 3:
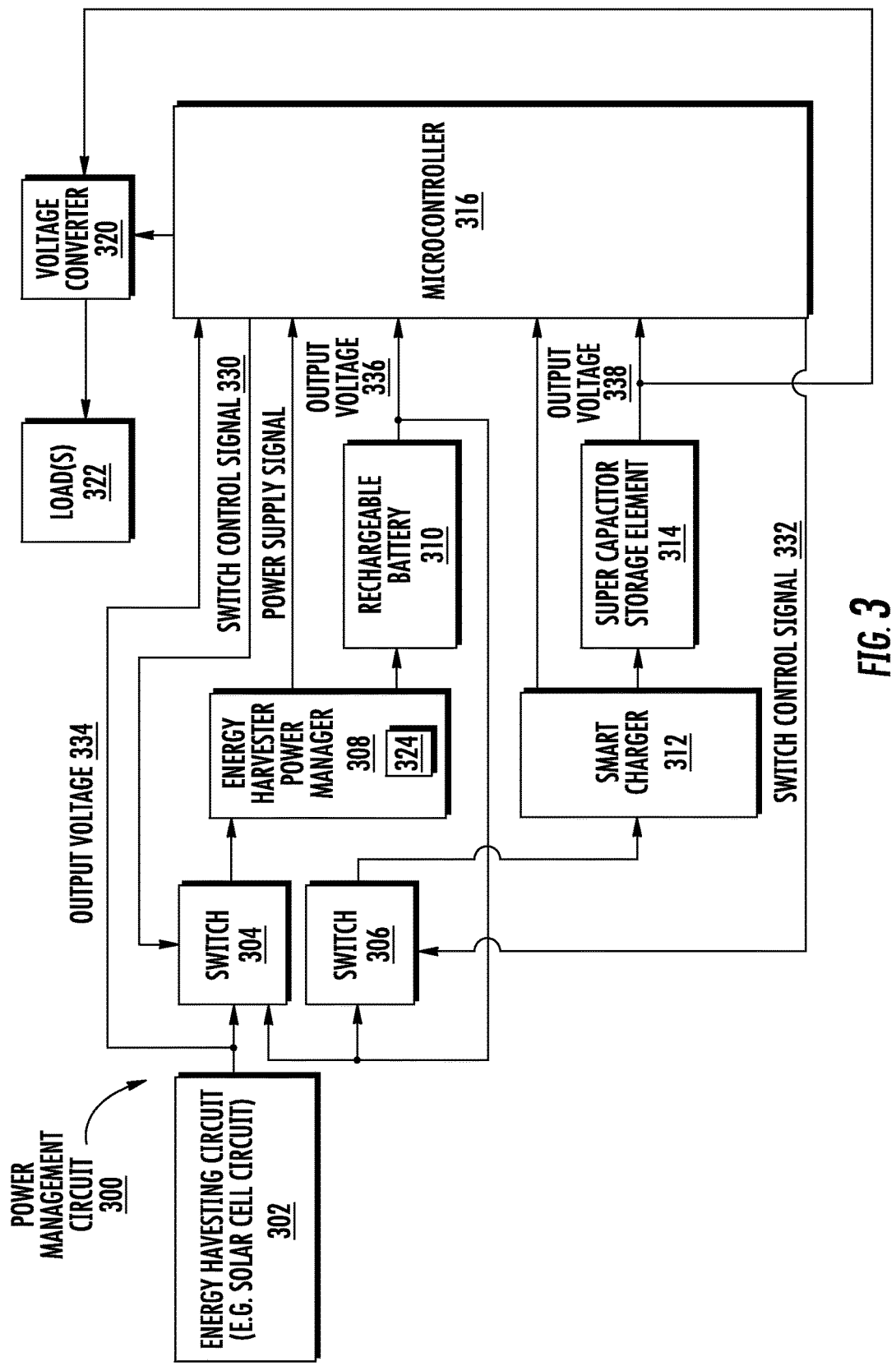
FIG. 3 is a block diagram of power management circuitry of the EHS system shown in FIGS. 1-2.

Referring now to FIG. 3, there is provided a block diagram of an exemplary architecture 300 for the PMC of the EHS system 100. The PMC is configured to provide a way in which the EHS system 100 is: deployable as a plug-n-play energy harvested wireless sensor that is ready to function as soon as it is turned on; and a self-sustaining sensor system wherein its power source would virtually never need to be replaced. In this regard, the PMC 300 comprises an energy harvesting circuit 302, switches 304, 306, an Energy Harvester Power Manager ("EHPM") 308, a rechargeable battery 310, a Super Capacitor ("SC") storage element 314, a smart charger 312 for the SC storage element, a microcontroller 316, a DC-DC voltage converter 320 and load(s) 322. In some scenarios, the energy harvesting circuit 302 comprises a solar cell circuit. The present invention is not limited in this regard. Other types of energy harvesting circuits can be used herein that generate a relatively low amount of output power.

At initial power up of the EHS system 100, the SC storage element 314 is assumed to be in a completely discharged state. Thus, the initial charge of the SC storage element 314 is at a level of approximately or substantially equal to zero volts. However, the rechargeable battery 310 is in a quasi-discharged state in which its initial charge is at a level greater than zero volts (e.g., 3 volts). As such, the rechargeable battery 310 has a sufficient amount of initial stored energy to nearly instantaneously enable operations of the control electronics of the EHS system 100 (i.e., the EHPM 308 and the microcontroller 316). In this regard, an output voltage 336 is supplied from the rechargeable battery 310 to the EHPM 308 via switch 304, whereby operations of boost converters 324 contained in the EHPM 308 are started immediately after turning on the EHS system 100. The output voltage 336 is also supplied from the rechargeable battery 310 to the microcontroller 316 via the EHPM 308.

The available power from rechargeable battery is also used at this time to charge the SC storage element 314. In this regard, the output voltage 336 of the rechargeable battery 310 is supplied to the SC storage element 314 via switch 306 and smart charger 312, whereby charging of the SC storage element is expedited. An output voltage 338 of the SC storage element is supplied to the load(s) 322 via the voltage converter 320. The load(s) can include, but is(are) not limited to, smoke detectors, gas detectors and/or the like. The EHS system 100 is considered fully operational when the output voltage 338 reaches a level (e.g., 3.8 V) that is sufficient to cause the load(s) to perform the intended operations thereof.

Throughout operation of the EHS system 100, the microcontroller 316 monitors the output voltage 334 of the solar cell circuit 302, as well as the output voltage 336 of the rechargeable battery and the output voltage 338 of the SC storage element 314. Once the output voltage 338 of the SC storage element 314 reaches a desired voltage (e.g., 3.8 V) after system activation (or powering on), the microcontroller 316 enables a timer to time the charging of the SC storage element 314. After a pre-determined time period (e.g., 6 hours), an assumption is made that the SC storage element 314 has reached its leakage current equilibrium, and therefore no longer needs to be charged. In effect, the microcontroller 316 may optionally perform operations at this time to terminate the supply of output voltage 336 to the SC storage element 314 via switch 306 and smart charger 312.

When the output voltage 338 of the SC storage element 314 falls below a threshold value (e.g., 3.3 V), the microcontroller 316 communicates a switch control signal 332 to switch 306 so as cause the output voltage 336 of the rechargeable battery 310 to once again be supplied to the SC storage element 314 via the smart charger 312. Output voltage 336 is supplied to the SC storage element 314 until the output voltage 338 thereof exceeds an upper threshold value. In effect, the SC storage element 314 is recharged whereby the energy expended while driving load(s) 322 is(are) restored.

When the solar cell circuit 302 is active, the output voltage 334 of the solar cell circuit 302 is supplied to the rechargeable battery 310 via EHPM 308. In effect, the rechargeable battery 310 is recharged by the solar cell circuit 302, whereby the energy expended in charging and recharging the SC storage element 314 is restored while the EHS system 100 is maintained in its fully operational state.

The above described process of using the rechargeable battery 310 to charge the SC storage element 314 is repeated as needed. Thus, the above described EHS system 100 performs self-monitoring and charges its respective rechargeable elements throughout its entire operation.

Figure 4:
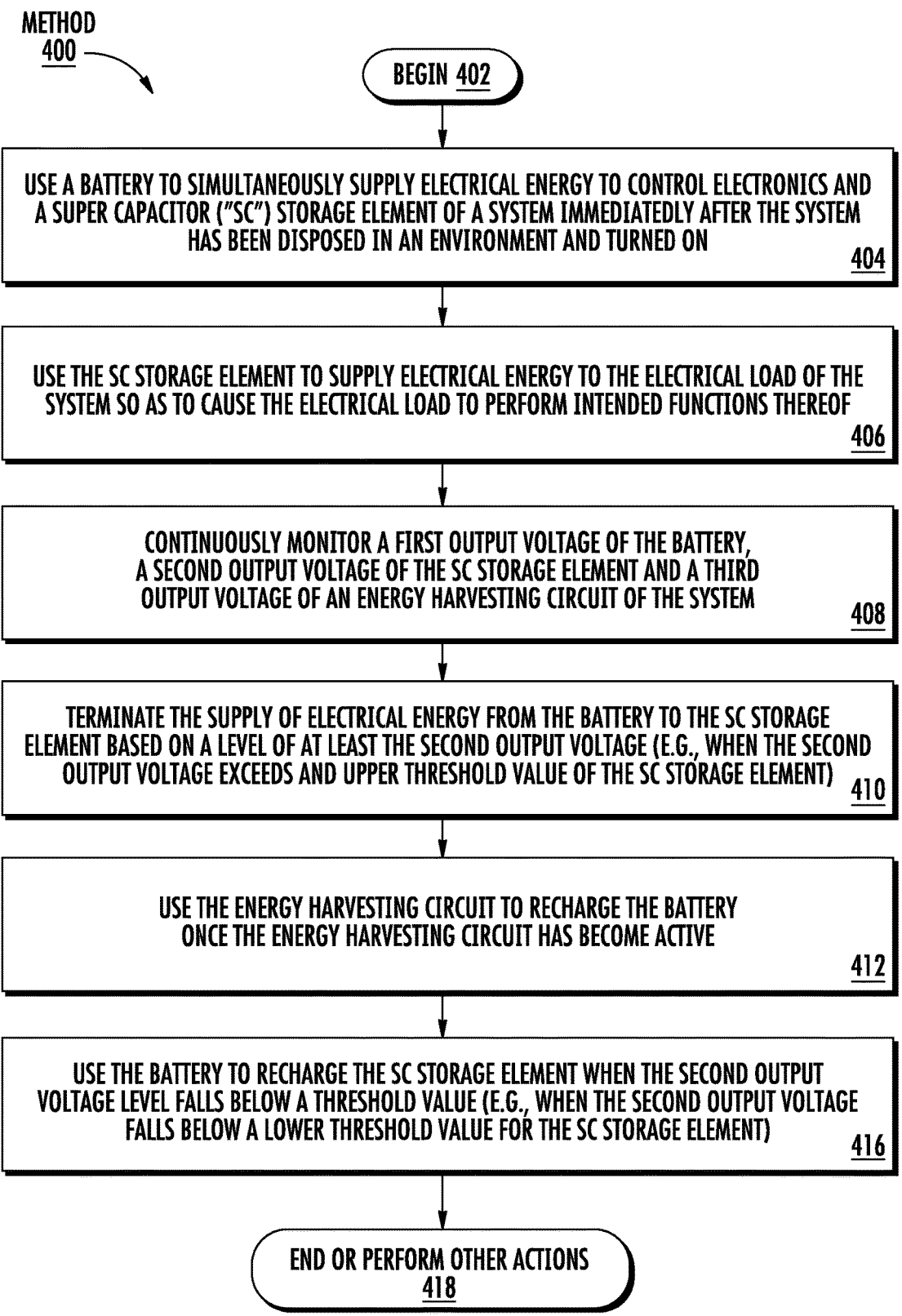
FIG. 4 is flow diagram of an exemplary method for powering an electrical load in an environment.

Referring now to FIG. 4, there is provided a flow diagram of an exemplary method 400 for powering an electrical load in an environment. The method 400 begins with step 402 and continues with step 404. In step 404, a battery (e.g., rechargeable battery 310) is used to simultaneously supply electrical energy to control electronics (e.g., control electronics 308, 316 of FIG. 3) and an SC storage element (e.g., SC storage element 314 of FIG. 3) of a system (e.g., system 100 of FIG. 1) immediately after the system has been disposed in the environment and activated (or turned on). In effect, the control electronics are caused to perform intended functions thereof nearly instantaneously after activating (or turning on) the system. The SC storage element is charged from a first charge state in which approximately zero volts exist across terminals thereof to a second charge state in which greater than zero volts exists across the terminals. The SC storage element is then used in step 406 to supply electrical energy to the electrical load (e.g., load 322 of FIG. 3) of the system so as to cause the electrical load to perform intended functions thereof.

Notably, the system continuously monitors a first output voltage of the battery, a second output voltage of the SC storage element and a third output voltage of an energy harvesting circuit of the system (e.g., energy harvesting circuit 302 of FIG. 3). The supply of electrical energy from the battery to the SC storage element is terminated in step 410 based on a level of at least the second output voltage. For example, in some scenarios, the battery's supply of electrical energy to the SC storage element is terminated when a determination is made that the SC storage element has reached a leakage current equilibrium or a determination that the output voltage of the SC storage element exceeds an upper threshold value thereof. The leakage current equilibrium is determined to be reached upon an expiration of a pre-defined time period (e.g., 6 hours) which was detected based on an output of a previously enabled timer.

The energy harvesting circuit is used in step 412 to recharge the battery once it becomes active. In a next step 416, the battery is used to recharge to SC storage element when the second output voltage falls below a first threshold value (e.g., when the output voltage of the SC storage element falls below a lower threshold value). Subsequent to completing step 416, step 418 is performed where method 400 ends or other actions are performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for powering an electrical load in an environment, comprising:

using a rechargeable battery to simultaneously supply electrical energy to control electronics and a Super Capacitor ("SC") storage element of a system immediately after the system has been disposed in the environment and turned on, whereby the control electronics are caused to perform intended functions thereof nearly instantaneously after turning on the system and the SC storage element is charged from a first charge state in which approximately zero volts exists across terminals thereof to a second charge state in which greater than zero volts exists across said terminals;

using the SC storage element to supply electrical energy to the electrical load of the system so as to cause the electrical load to perform intended functions thereof;

continuously monitoring a first output voltage of the rechargeable battery, a second output voltage of the SC storage element and a third output voltage of an energy harvesting circuit of the system;

terminating the supply of electrical energy from the rechargeable battery to the SC storage element based on a level of at least the second output voltage;

using the energy harvesting circuit to recharge the rechargeable battery;

using the rechargeable battery to recharge the SC storage element when the second output voltage falls below a first threshold value.

2. The method according to claim 1, further comprising enabling a timer when the second output voltage reaches a desired level.

3. The method according to claim 2, further comprising making a determination that the SC storage element has reached a leakage current equilibrium upon an expiration of a pre-defined time period which was detected based on an output of said timer.

4. The method according to claim 3, wherein the rechargeable battery's supply of electrical energy to the SC storage element is terminated when said determination is made.

5. The method according to claim 1, further comprising detecting when the second output voltage of the SC storage element reaches a pre-defined level.

6. The method according to claim 5, wherein the rechargeable battery's recharge of the SC storage element is terminated when the second output voltage of the SC storage element reaches the pre-defined threshold level.

7. A system, comprising:
control electronics;
a Super Capacitor ("SC") storage element electrically connected to the control electronics and used to supply electrical energy to an electrical load so as to cause the electrical load to perform intended functions thereof;
a rechargeable battery electrically coupled to the control electronics and selectively couplable indirectly to the SC storage element, where the rechargeable battery simultaneously supplies electrical energy to the control electronics and the SC storage element immediately after the system has been disposed in an environment and turned on, whereby the control electronics are caused to perform intended functions thereof nearly instantaneously after turning on the system and the SC storage element is charged from a first charge state in which approximately zero volts exists across terminals thereof to a second charge state in which greater than zero volts exists across the terminals; and
an energy harvesting circuit coupled to the control electronics and coupled to the rechargeable battery;
wherein the control electronics continuously monitor a first output voltage of the rechargeable battery, a second output voltage of the SC storage element and a third output voltage of an energy harvesting circuit; and
wherein the supply of electrical energy from the rechargeable battery to the SC storage element is terminated based on a level of at least the second output voltage, the energy harvesting circuit recharges the rechargeable battery when active, and the rechargeable battery recharges the SC storage element when the second output voltage falls below a first threshold value.

8. The system according to claim 7, wherein the control electronics enable a timer when the second output voltage reaches a desired level.

9. The system according to claim 8, wherein the control electronics make a determination that the SC storage element has reached a leakage current equilibrium upon an expiration of a pre-defined time period which was detected based on an output of said timer.

10. The system according to claim 9, wherein the rechargeable battery's supply of electrical energy to the SC storage element is terminated when said determination is made.

11. The system according to claim 7, wherein the control electronics detect when the second output voltage of the SC storage element reaches a pre-defined level.

12. The system according to claim 11, wherein the rechargeable battery's recharging of the SC storage element is terminated when the second output voltage of the SC storage element reaches the pre-defined level.

13. A system, comprising:
control electronics;
a Super Capacitor ("SC") storage element electrically connected to the control electronics and used to supply electrical energy to an electrical load so as to cause the electrical load to perform intended functions thereof;
a rechargeable battery electrically coupled to the control electronics and selectively couplable to the SC storage element, where the rechargeable battery simultaneously supplies electrical energy to the control electronics and the SC storage element immediately after the system has been disposed in an environment and turned on, whereby the control electronics are caused to perform intended functions thereof nearly instantaneously after turning on the system and the SC storage element is charged from a first charge state in which approximately zero volts exists across terminals thereof to a second charge state in which greater than zero volts exists across the terminals; and
an energy harvesting circuit coupled to the control electronics and coupled to the rechargeable battery such that the rechargeable battery is rechargeable by the energy harvesting circuit.

14. The system according to claim 13, wherein the rechargeable battery's charge of the SC storage element is terminated based on a level of the output voltage of the SC storage element.

15. The system according to claim 13, wherein the rechargeable battery recharges the SC storage element when the output voltage of the SC storage element falls below a first threshold value.

* * * * *